United States Patent
Bittar (10) Patent No.: US 6,353,321 B1
(45) Date of Patent: Mar. 5, 2002

(54) UNCOMPENSATED ELECTROMAGNETIC WAVE RESISTIVITY TOOL FOR BED BOUNDARY DETECTION AND INVASION PROFILING

(75) Inventor: Michael Bittar, Houston, TX (US)

(73) Assignee: Halliburton Energy Services, Inc.

( * ) Notice: Subject to any disclaimer, the term of this patent is extended or adjusted under 35 U.S.C. 154(b) by 0 days.

(21) Appl. No.: 09/492,592

(22) Filed: Jan. 27, 2000

(51) Int. Cl.[7] ................................................. G01V 3/08
(52) U.S. Cl. ........................ 324/338; 324/339; 324/343; 702/7
(58) Field of Search .................................. 324/338, 339, 324/341, 334, 346, 233, 343; 702/7; 175/50

(56) References Cited

U.S. PATENT DOCUMENTS

| | | | | |
|---|---|---|---|---|
| 4,899,112 A | * | 2/1990 | Clark et al. .................. | 324/338 |
| 4,945,987 A | * | 8/1990 | Wittrisch ............... | 166/250.17 |
| 6,163,155 A | * | 12/2000 | Bittar .......................... | 324/338 |
| 6,181,138 B1 | * | 1/2001 | Hagiwara et al. ........... | 324/338 |

* cited by examiner

Primary Examiner—Glenn W. Brown
Assistant Examiner—Subhash A. Zaveri
(74) Attorney, Agent, or Firm—Conley, Rose & Tayon, P.C.

(57) ABSTRACT

A resistivity tool and associated method include measuring the phase shift of an electromagnetic signal at different locations. Preferably, this is accomplished by a resistivity tool having three receivers. The difference of the phase shifts at the different locations indicates with precision the depth in a borehole of a bed boundary. The preferred resistivity tool also yields improved radial resolution.

24 Claims, 14 Drawing Sheets

UNCOMPENSATED ELECTROMAGNETIC WAVE RESISTIVITY TOOL FOR BED BOUNDARY DETECTION AND INVASION PROFILING

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Figure 1:
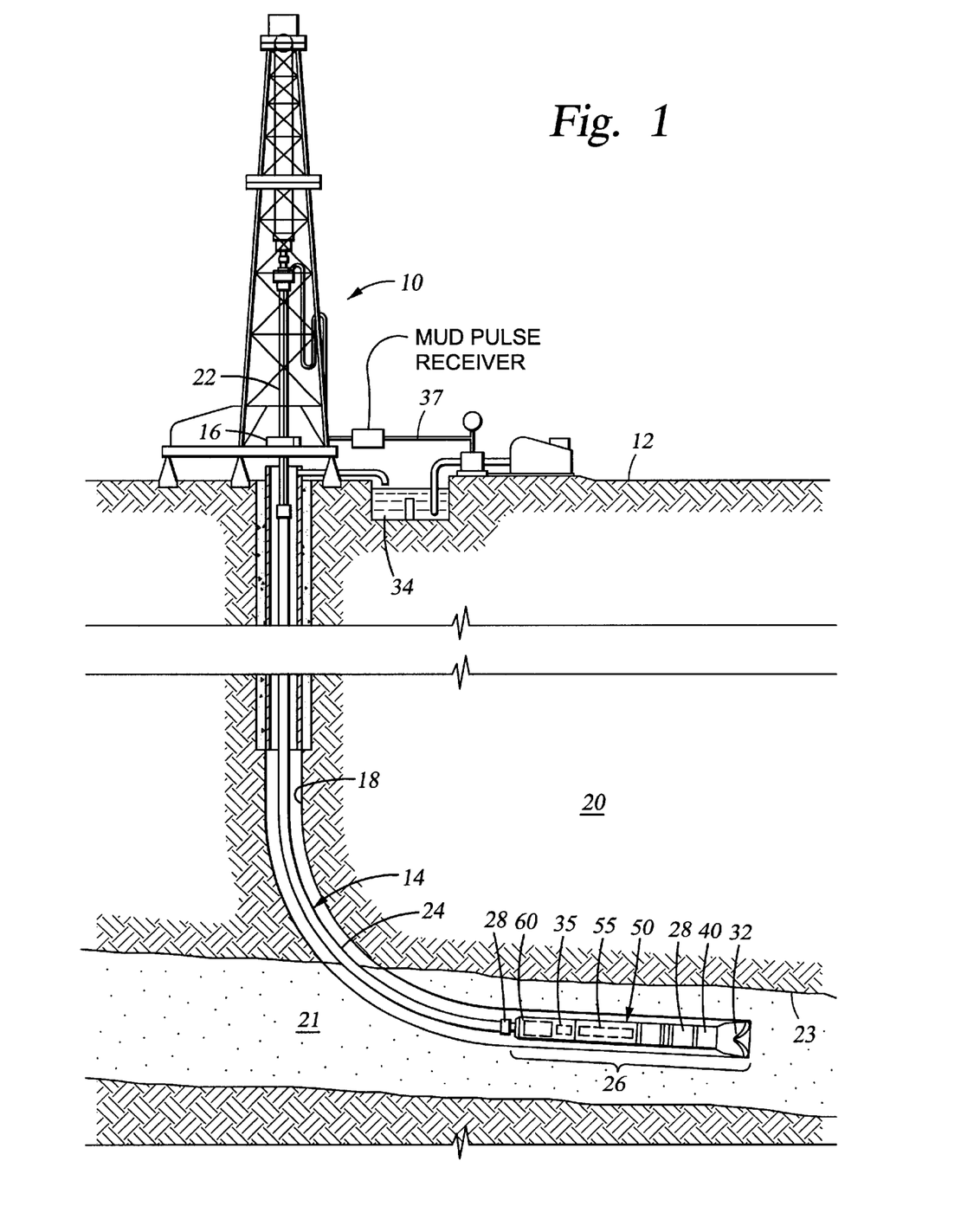
FIG. 1 is a is an illustrative example of a drilling system.

In drilling a borehole in the earth, such as for the recovery of hydrocarbons or for other applications, it is conventional practice to connect a drill bit on the lower end of an assembly of drill pipe sections which are connected end-to-end so as to form a "drill string." FIG. 1 includes a drilling installation having a drilling rig 10 at the surface 12 of a well, supporting a drill string 14. The drill string includes a bottom hole assembly 26 (commonly referred to as a "BHA") coupled to the lower end of the drill string 14. The BHA includes the drill bit 32, which rotates to drill the borehole. As the drill bit 32 operates, drilling fluid or mud is pumped from a mud pit 34 at the surface into the drill pipe 24 and to the drill bit 32. After flowing through the drill bit 32, the drilling mud rises back to the surface, where it is collected and returned to the mud pit 34 for filtering.

Modern drilling operations demand a great quantity of information relating to the parameters and conditions encountered downhole to permit the driller to change the direction of drilling to find or stay in formations that include sufficient quantities of hydrocarbons. Such information typically includes characteristics of the earth formations traversed by the wellbore, in addition to data relating to the size and configuration of the borehole itself. The collection of information relating to conditions downhole, which commonly is referred to as "logging," can be performed by several methods.

Logging has been known in the industry for many years as a technique for providing information regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface, and control signals from the surface to the sonde. In accordance with conventional techniques, various parameters of the earth's formations are measured and correlated with the position of the sonde in the borehole, as the sonde is pulled uphole.

While wireline logging is useful in assimilating information relating to formations downhole, it nonetheless has certain disadvantages. For example, before the wireline logging tool can be run in the wellbore, the drillstring and bottomhole assembly first must be removed or "tripped" from the borehole, resulting in considerable cost and loss of drilling time for the driller (who typically is paying daily fees for the rental of drilling equipment). In addition, because wireline tools are unable to collect data during the actual drilling operation, the drilling service company must at times make decisions (such as the direction to drill, etc.) possibly without sufficient information, or else incur the cost of tripping the drillstring to run a logging tool to gather more information relating to conditions downhole. In addition, because wireline logging occurs a relatively long period after the wellbore is drilled, the accuracy of the wireline measurement can be compromised. As one skilled in the art will understand, the wellbore conditions tend to degrade as drilling fluids invade the formation in the vicinity of the wellbore. Consequently, a resistivity tool run one or more days after a borehole section has been drilled may produce measurements that are influenced by the resistivity of the mud that has invaded the formation. In addition, the shape of the borehole may begin to degrade, reducing the accuracy of the measurements. Thus, generally, the sooner the formation conditions can be measured, the more accurate the reading is likely to be. Moreover, in certain wells, such as horizontal wells, running wireline tools can be problematic.

Because of these limitations associated with wireline logging, there is an emphasis on developing tools that can collect data during the drilling process itself. By collecting and processing data and transmitting it to the surface real-time while drilling the well, the driller can more accurately analyze the surrounding formation, and also can make modifications or corrections, as necessary, to optimize drilling performance. With a steerable system the driller may change the direction in which the drill bit is headed. By detecting the adjacent bed boundaries, adjustments can be made to steer the drill bit in an oil bearing layer or region. Moreover, the measurement of formation parameters during drilling, and hopefully before invasion of the formation, increases the usefulness of the measured data. Further, making formation and borehole measurements during drilling can save the additional rig time which otherwise would be required to run a wireline logging tool.

Designs for measuring conditions downhole and the movement and the location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used generically with the understanding that the term encompasses systems that collect formation parameter information either alone or in combination with the collection of information relating to the position of the drilling assembly.

The measurement of formation properties during drilling of the well by LWD systems thus improves the timeliness of measurement data and, consequently, increases the efficiency of drilling operations. Typically, LWD measurements are used to provide information regarding the particular formation through which the borehole crosses. Currently, resistivity tools are logging sensors or tools that commonly are used as part of either a wireline or an LWD system. For a formation to contain hydrocarbons, the rock comprising the formation must have certain well known physical characteristics. One characteristic is that the formation has a certain measurable resistivity (the inverse of conductivity). This resistivity can be determined by sending an electromagnetic wave signal of a particular frequency that travels through the formation. As will be apparent to one skilled in the art, a wave traveling from point A to point B through a formation is attenuated and its phase is shifted proportional to the conductivity of the formation. Analysis of this attenuation and phase shift provides the resistivity of the formation surrounding the resistivity tool, which then can be used in combination with other measurements to determine whether the formation will produce hydrocarbons.

Ordinarily, a well is drilled vertically for at least a portion of its final depth. The layers, strata, or "beds" that make up the earth's crust are generally substantially horizontal. Therefore, during vertical drilling, the well is substantially perpendicular to the geological formations through which it passes. A sudden measured change in resistivity by a resistivity tool generally indicates the presence of a bed boundary between layers. For example, in a so-called "shaley" formation with no hydrocarbons, the shaley formation has a very low resistivity. In contrast, a bed of oil-saturated sandstone is likely to have a much higher resistivity.

Figure 2:
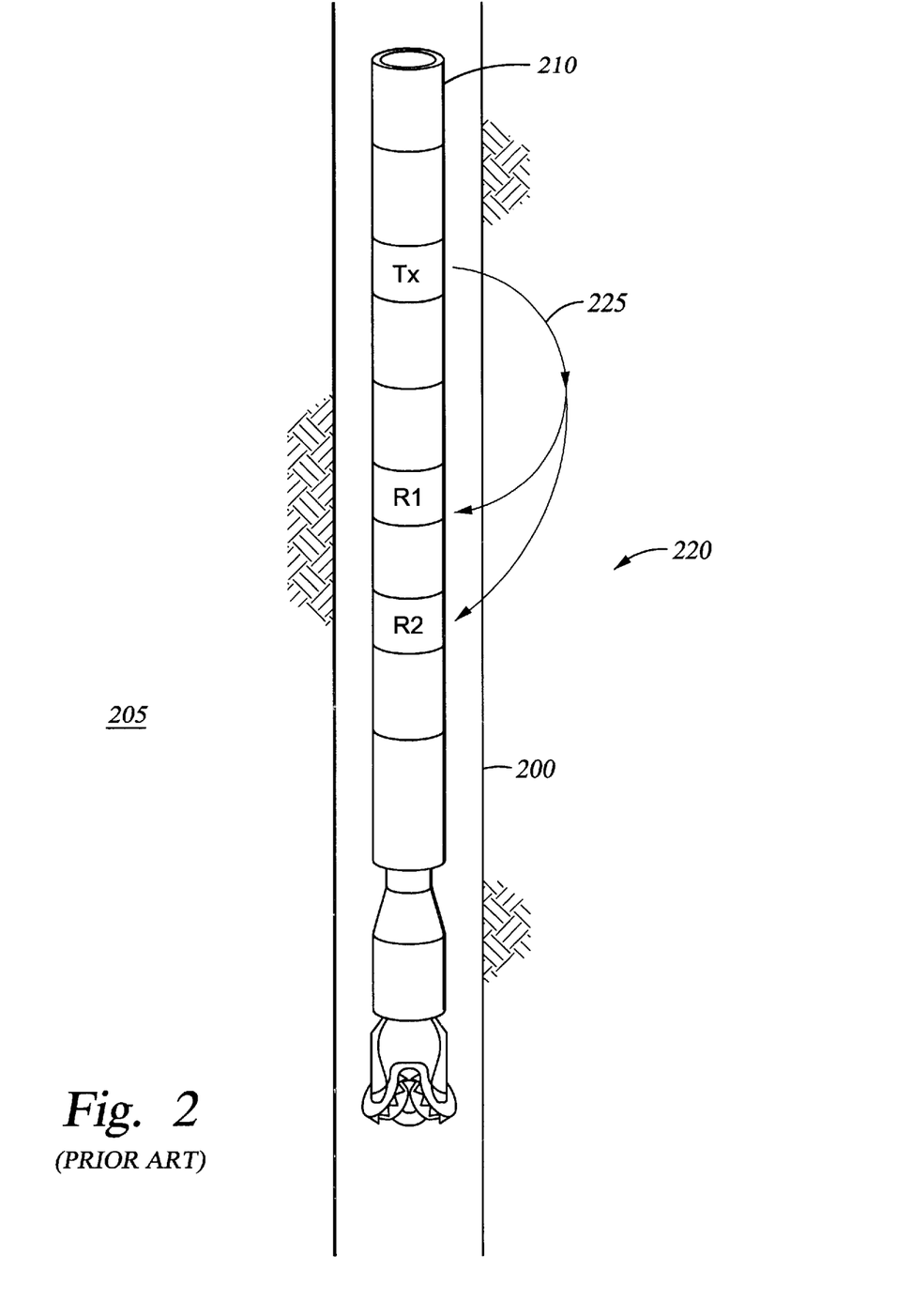
FIG. 2 is a diagram of a first prior art resistivity tool.

FIG. 2 shows a conventional resistivity tool 220 as part of a bottomhole assembly. A well bore 200 is drilled through formation 205, and contains a drill string 210. Attached to drill string 210 is drill bit 215. The resistivity tool includes a transmitting loop antenna $T_x$ that transmits electromagnetic signals into the formation. The resistivity tool also includes a pair of loop antennas, $R_1$ and $R_2$, positioned predetermined distances from the transmitter. Transmitter $T_x$ generates an electromagnetic (EM) wave 255 at a selected frequency that is received at receivers $R_1$ and $R_2$ after traveling through the formation 205. First and second signals at the receivers result. The amplitude ratio and the phase difference of the EM wave can then be measured and a resistivity measurement derived for a particular depth. Thus, the tool indicates the presence of a bed boundary by the rapid change in value of the resistivity measurements.

Figure 3:
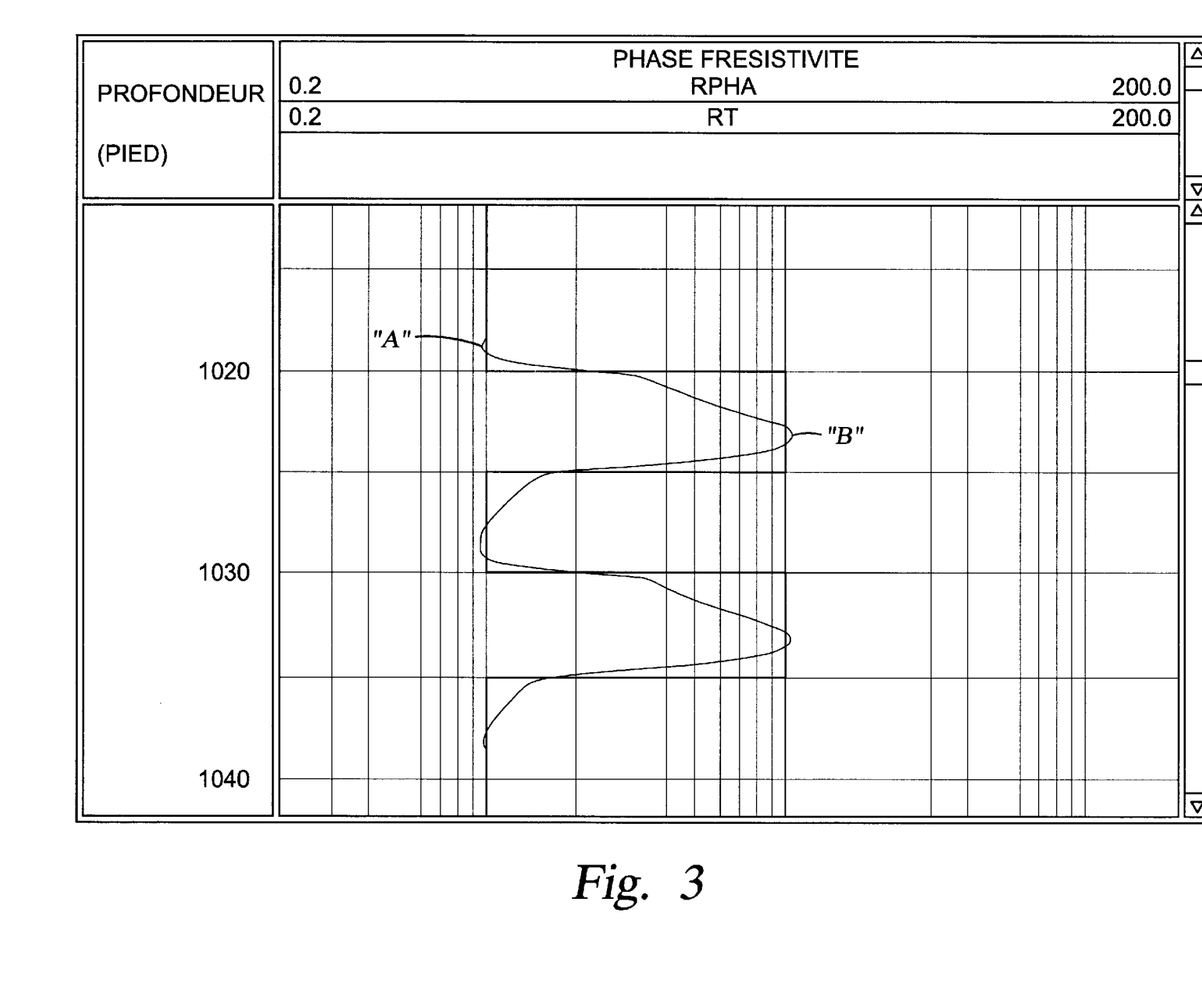
FIG. 3 is an inflection point resistivity-depth log of a first formation.
Figure 4:
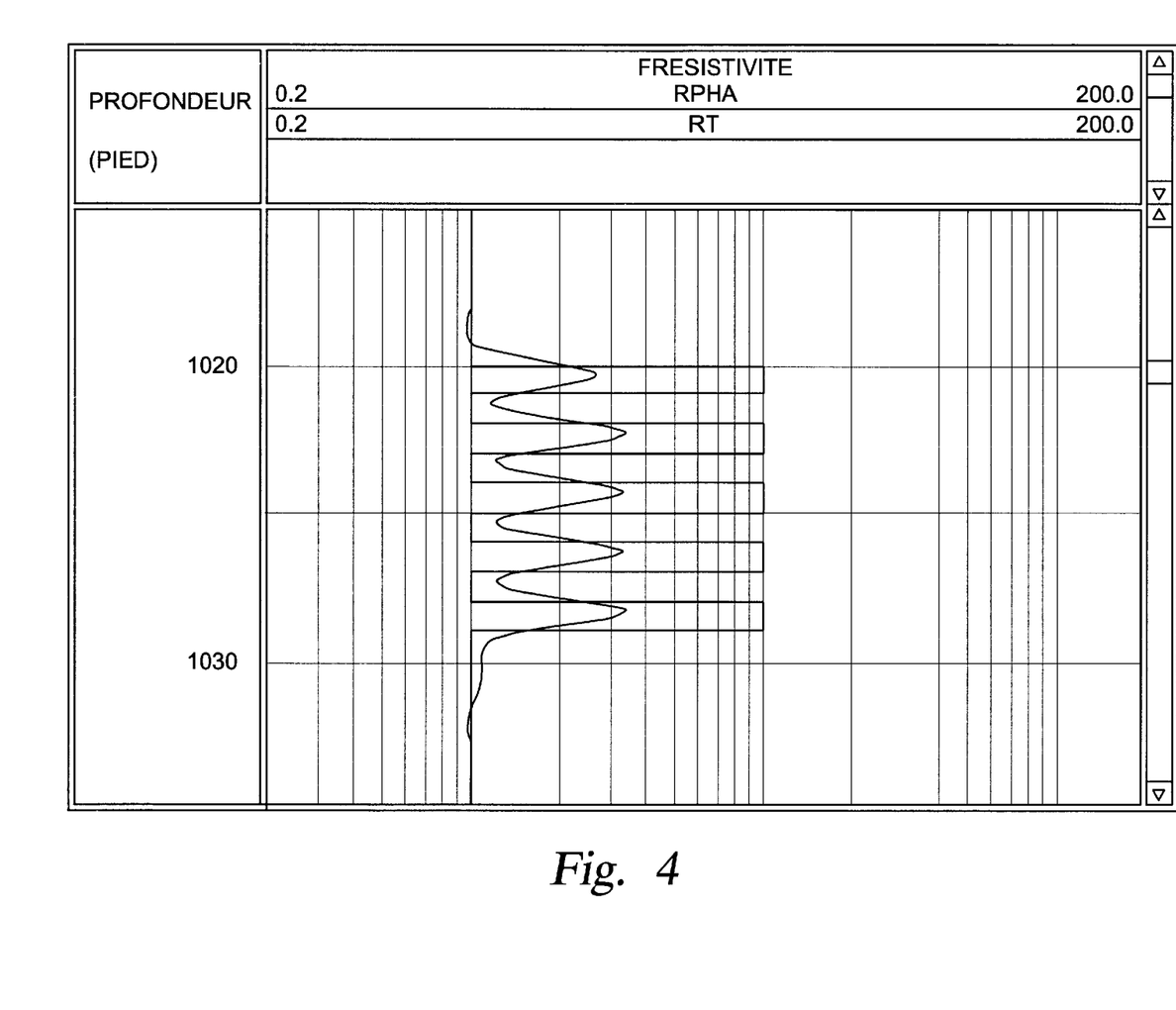
FIG. 4 is an inflection point resistivity-depth log of a second formation.

FIG. 3 shows a depth-resistivity log as measured for a sample wellbore by a conventional resistivity tool, such as shown in FIG. 2. Along the x-axis, resistivity measurements range between 0.2 and 200 ohms. Along the y-axis, a depth reading ranges from about 1010 feet to 1040 feet. Between an "A" depth of about 1018 feet and a "B" depth of about 1023 feet, the measured resistivity rises substantially, indicating the presence of a bed boundary somewhere between these depths. However, although the resistivity tool that made these measurements indicates a bed boundary somewhere between depth "A" and depth "B", the exact depth for the bed boundary is unclear. The best guess for this bed boundary depth is called the "inflection point." The lack of resolution regarding the depth of bed boundaries is particularly troublesome when drilling through a series of relatively thin beds. FIG. 4 is a depth-resistivity graph as measured for a sample wellbore having numerous adjacent thin beds of varying resistivities. Along the x-axis, resistivity measurements range between 0.2 and 200 ohms. Along the y-axis, a depth reading ranges from about 1005 feet to about 1035 feet. Between a depth of about 1018 feet and 1032 feet there are numerous thin beds of varying resistivities. However, because the vertical resolution of the conventional resistivity tool is so poor, it is extremely difficult to establish with any accuracy the exact depth of each bed boundary. Further, even if a bed boundary depth may be determined, it is unclear whether the tool is entering a lower or higher resistivity bed layer.

Figure 5:
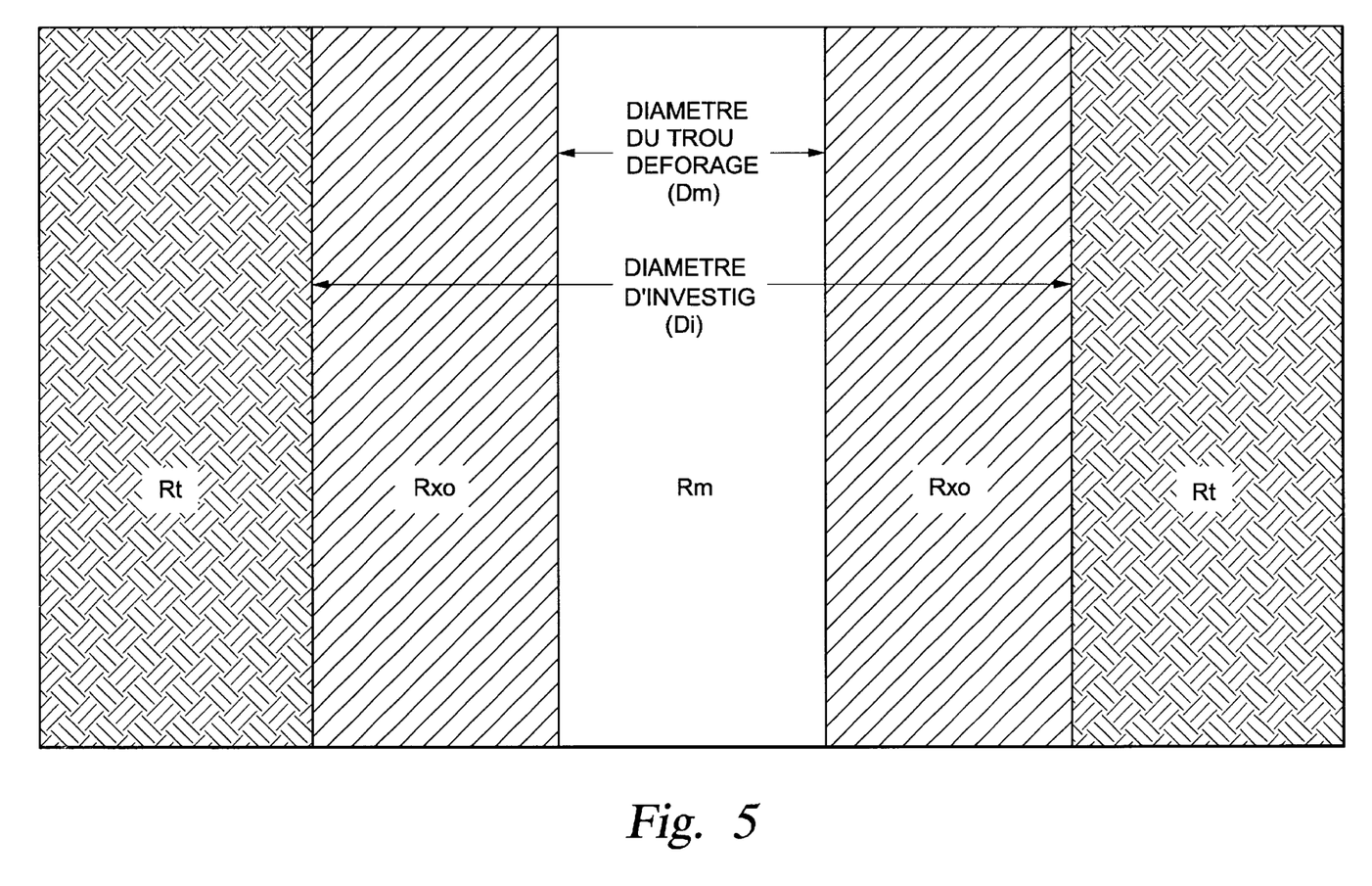
FIG. 5 illustrates the significance of resistivity measurements obtained at different radial depths of investigation.

Another problem with the conventional resistivity tool is an inability to measure resistivities deep into the formation surrounding the borehole. Generally speaking, it is desirable for the resistivity tool to measure at multiple depths into the formation around the borehole between the transmitter and receiver pair. This is referred to as the radial resolution of the tool. Referring to FIG. 5, the first and closest diameter of investigation relative to the resistivity tool is the area within the wellbore through which drilling mud flows back to the surface. If the resistivity of this area is measured inside the wellbore (around the tool itself), a resistivity value will be obtained that generally approximates the resistivity of the drilling mud, $R_m$. This diameter of investigation can be referred to as $D_m$, to denote that this is the depth of investigation that will produce a resistivity reading of the drilling mud. The next general area of investigation is the region within the surrounding formation that has been invaded by the drilling mud. This diameter of investigation can be referred to as $D_i$, because a resistivity measurement in this region will produce a resistivity value of approximately $R_{xo}$, which is the resistivity of the invaded zone. The third region of investigation for a resistivity tool, is the formation which has not been invaded by drilling mud. A resistivity measurement of this region will yield the true resistivity value of the formation, $R_t$. As one skilled in the art will understand, the diameters of investigation, $D_m$ and $D_i$ will vary depending upon many factors, including the position of the tool in the wellbore, the characteristics of the formation and the drilling mud, the time that has elapsed from when that portion of the wellbore was drilled, and the like. While information regarding $R_m$ and $R_{xo}$ are useful for purposes of evaluation, one of the goals of the resistivity tool is to measure the true formation resistivity, $R_t$. Thus, it is important to design the resistivity tool to have a sufficient depths of investigation to measure this resistivity. Ideally, this tool would also measure the resistivity of $R_m$, $R_{xo}$, and $R_t$ at many varying radial depths.

Figure 6:
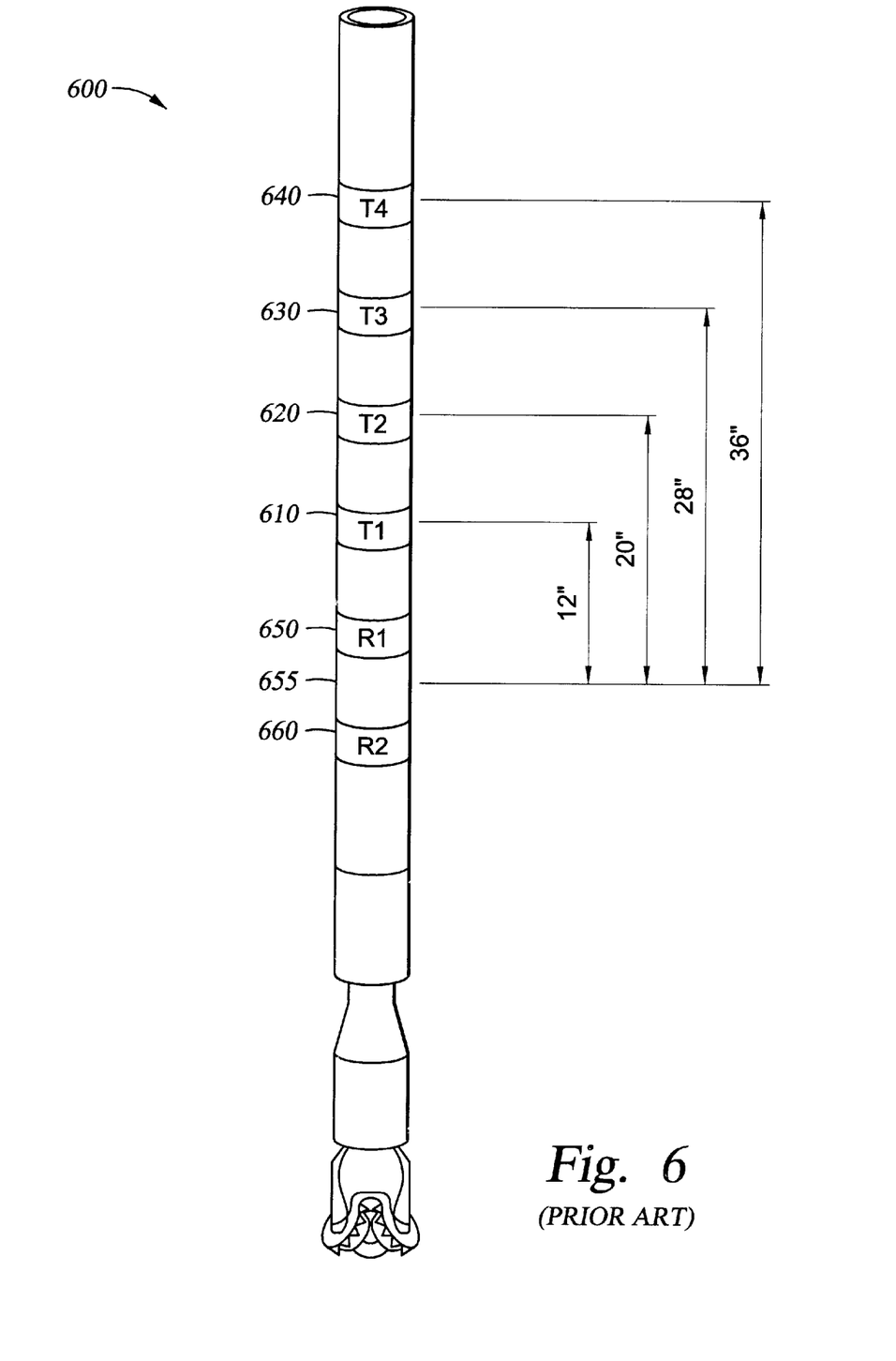
FIG. 6 is a diagram of a second prior art resistivity tool.
Figure 7:
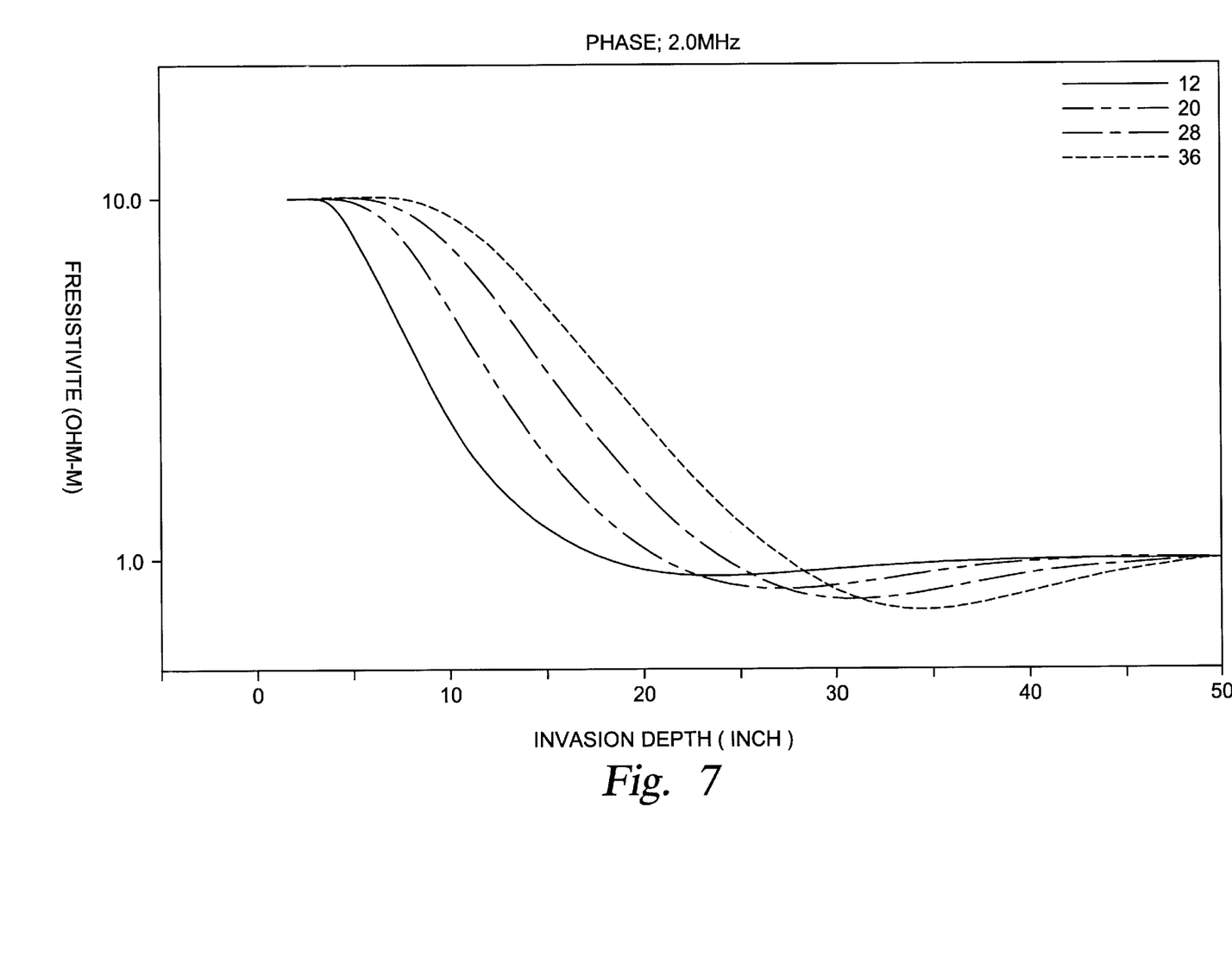
FIG. 7 is a resistivity-invasion depth graph according to the tool of FIG. 6.

In an attempt to improve radial resistivity data, it is known to add transmitters to the resistivity tool. FIG. 6 includes a resistivity tool 600 including first transmitter $T_1$, at axial location 610, second transmitter $T_2$ at axial location 620, third transmitter $T_3$ at axial location 630, fourth transmitter $T_4$ at axial location 640, first receiver $R_1$ at axial location 650 and second receiver $R_2$ at axial location 660. First, second, third and fourth transmitters are each spaced 8" from one another. First receiver $R_1$ is spaced 8" from the first transmitter $T_1$. Second receiver $R_2$ is 8" from first receiver $R_1$. A measurement point 655 is halfway between first receiver $R_1$ and second receiver $R_2$. Thus, first, second, third, and fourth transmitters are 12, 20, 28, and 36 inches from measurement point 655, respectively. FIG. 7 is a resistivity-invasion depth graph showing data curves that might be obtained with the four transmitter resistivity tool of FIG. 6. These data curves correspond to transmitter-measurement point spacings of 12, 20, 28 and 36 inches. Nevertheless, this amount of data is still does not indicate to the desired degree the resistivities of the formation surrounding the borehole.

It would be desirable to develop a resistivity tool or method that can accurately determine the exact depth of bed boundaries. Ideally, such a tool or method could also indicate whether the resistivity tool is entering a higher or lower resistivity layer, even where numerous thin beds are adjacent to one another. In addition, it is desirable for such a resistivity tool to obtain an increased amount of data with respect to the radial resistivities surrounding the borehole.

SUMMARY OF THE INVENTION

A preferred embodiment of the invention features a logging while drilling measurement tool including first transmitter capable of generation of a signal, a first receiver, a second receiver, and a third receiver, the first and second receivers defining a first measurement location corresponding to a first phase shift for the signal, and the second and third receivers defining a second measurement location corresponding to a second phase shift for the signal, and a processor operating on the first and second phase shifts to locate a change in resistivity near the second measurement location. Preferably, this operation includes taking a difference between the first and second phase shifts. This tool can establish whether the tool is entering a relatively high resistivity region or a relatively low resistivity region.

The invention may also be described as a method to determine bed boundaries in a multi-layer formation, including measuring a phase shift of a travelling signal at a first location, measuring a phase shift of that travelling signal at a second location, and operating on the first phase shift and the second phase shift to determine if the first location corresponds to a different resistivity than the second location.

Thus, the embodiments of the invention comprise a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 1 is a third $\Delta\emptyset_4$ log as compared to the corresponding inflection point log.

DETAILED DESCRIPTION OF THE PREFERRED EMBODIMENT

Figure 8:
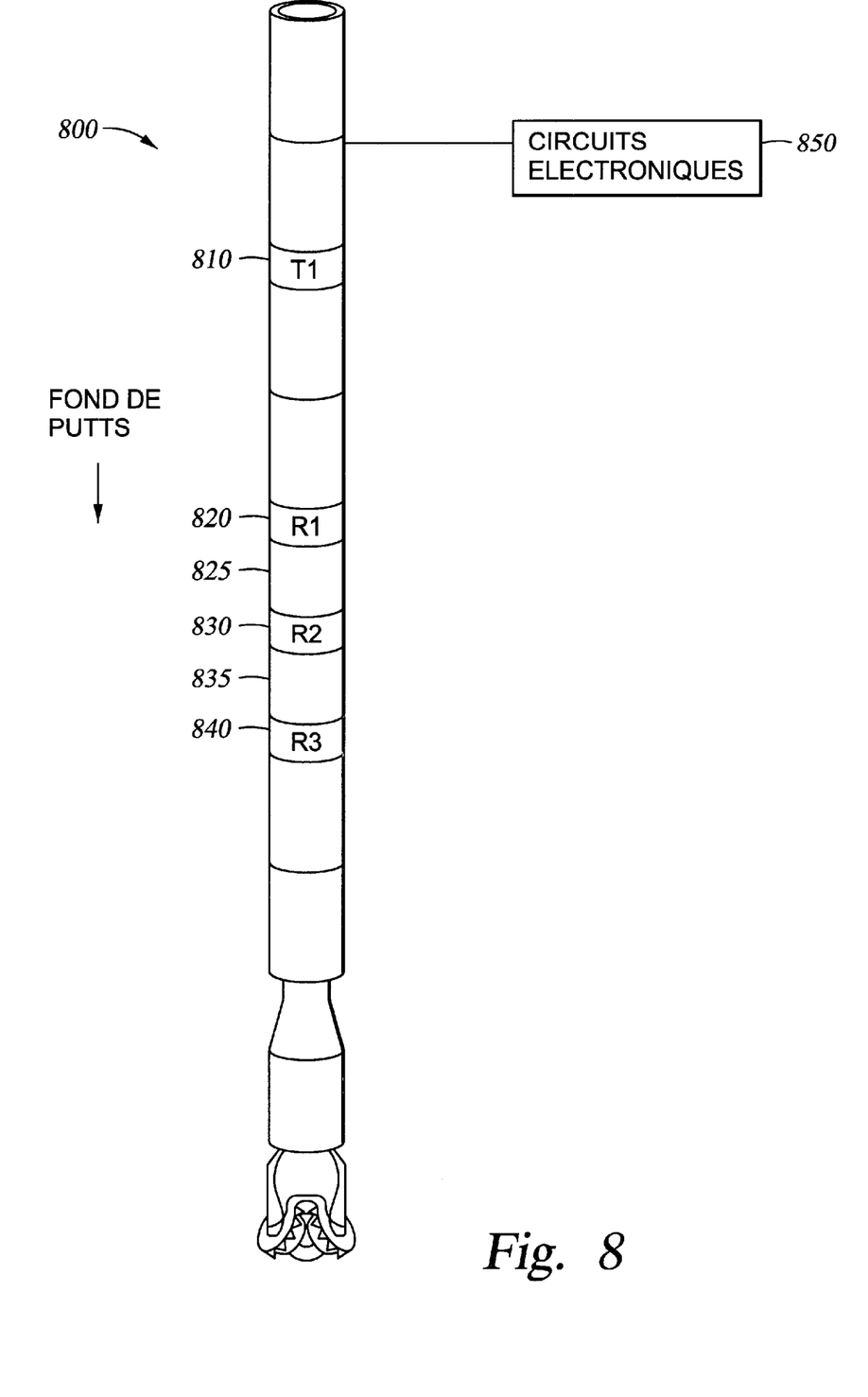
FIG. 8 is a diagram of a first resistivity tool according to the invention.

FIG. 8 includes a resistivity tool 800, including at least a first transmitter $T_1$ at axial location 810, a first receiver $R_1$ at axial location 820, a second receiver $R_2$ at axial location 830, and a third receiver $R_3$ at axial location 840. A first point of measurement 825 exists half-way between receivers $R_1$ and $R_2$. A second point of measurement 835 exists half-way between receivers $R_2$ and $R_3$. The resistivity tool 800 may also optionally contain additional transmitters. Also included are associated electronics 850 at any appropriate location. These electronics may include circuitry to fire transmitter $T_1$ at one or more particular frequencies, circuitry for detecting the resulting signal at each receiver, a downhole processor, and memory for storing the detected waveforms. The transmitters and receivers may appropriately be wires or coils wrapped around the outside of a drill string, as is well known, but may also be any other appropriate type or location. Such a resistivity tool is appropriate for placement downhole during drilling and is preferably an LWD tool. A direction labeled "downhole" is also shown to assist in an understanding of this embodiment.

During operation, the transmitter $T_1$ generates an EM wave at one or more frequencies that travels through the surrounding formation and to the receivers $R_1$, $R_2$, and $R_3$. The signal generated by the transmitter $T_1$, therefore, undergoes attenuation and phase shift as it travels from the transmitter $T_1$ through the formation. In particular, the EM signal will undergo separate and measurable attenuation and phase shift with respect to the measurement points corresponding to each pair of receivers, $R_1$, $R_2$, and $R_2$, $R_3$. Thus, the transmitted signal undergoes a first attenuation and phase shift corresponding to the first point of measurement 825, and undergoes a second attenuation and phase shift corresponding to the second point of measurement 835. The first phase shift is referred to as $\Delta\emptyset_1$. The second phase shift is referred to as $\Delta\emptyset_2$. An associated processor or microprocessor in electronics 850 can find a phase shift $\Delta\emptyset_3$ corresponding to a location half-way between measurement points 825 and 835. This phase shift may be obtained from the equation:

$$\Delta\phi_3 = \frac{\Delta\phi_1 + \Delta\phi_2}{2} \qquad (1)$$

As known in the prior art, a single phase shift may be used to determine the resistivity of the formation at a single location proximate the midpoint of two receivers. The resistivity of the formation corresponding to locations 825, 830, and 835 may therefore be determined by those artisans of ordinary skill.

Moreover, $\Delta\emptyset_1$ and $\Delta\emptyset_2$ may be used to accurately determine the bed boundary location. If the difference in the phase shifts, $\Delta\emptyset_4$, is defined as:

$$\Delta\emptyset_4 = \Delta\emptyset_2 - \Delta\emptyset_1 \qquad (2)$$

then the phase change $\Delta\emptyset_4$ has a small value in a homogenous formation, but a large value at a bed boundary. An abrupt change in $\Delta\emptyset_4$ therefore corresponds to an exact depth of a bed boundary.

Figure 14:
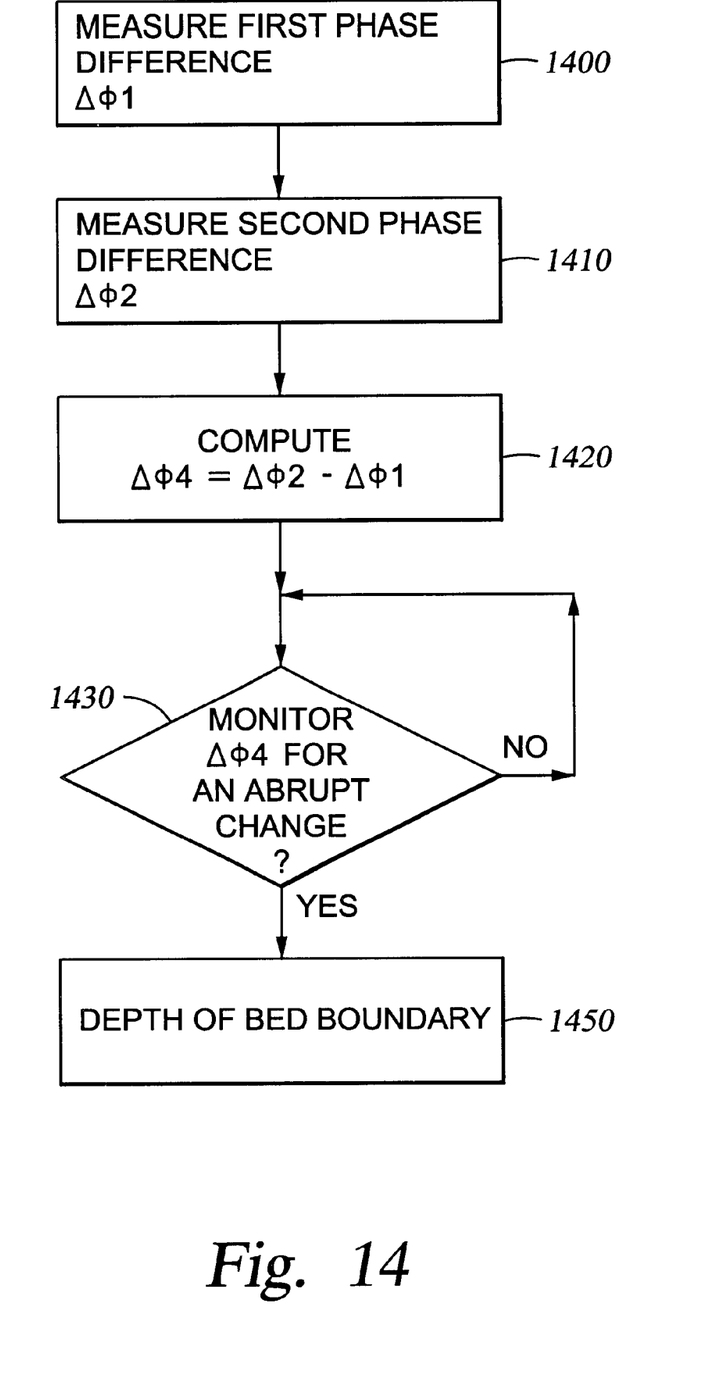
FIG. 14 is a flow chart of a method according to the invention.

FIG. 14 is a flow chart of this method. At step 1400, a first phase difference is measured for a signal travelling from a transmitter through a formation. At step 1410, a second phase difference is measured at a different location for this signal travelling through the formation. At step 1420, the value $\Delta\emptyset_4$ is found by subtracting $\Delta\emptyset_1$ from $\Delta\emptyset_2$. It is of course to be understood that an equally useful value as $\Delta\emptyset_4$ could be found by subtracting $\Delta\emptyset_2$ from $\Delta\emptyset_1$. At step 1430, the value of $\Delta\emptyset_4$ is monitored for an abrupt change. When an abrupt change occurs, a bed boundary is indicated at step 1450.

If this value of $\Delta\emptyset_4$ is found downhole by an associated processor, for example, this data can be transmitted to the surface by suitable devices such as a mud siren or other appropriate device. At the surface, the data can be used quickly to stop or change the direction of drilling. Alternately, the data may be stored downhole, it may be processed uphole, a portion of the data (such as the presence of a bed boundary) may be transmitted uphole while the remainder is stored downhole, or it may be otherwise manipulated.

Figure 9:
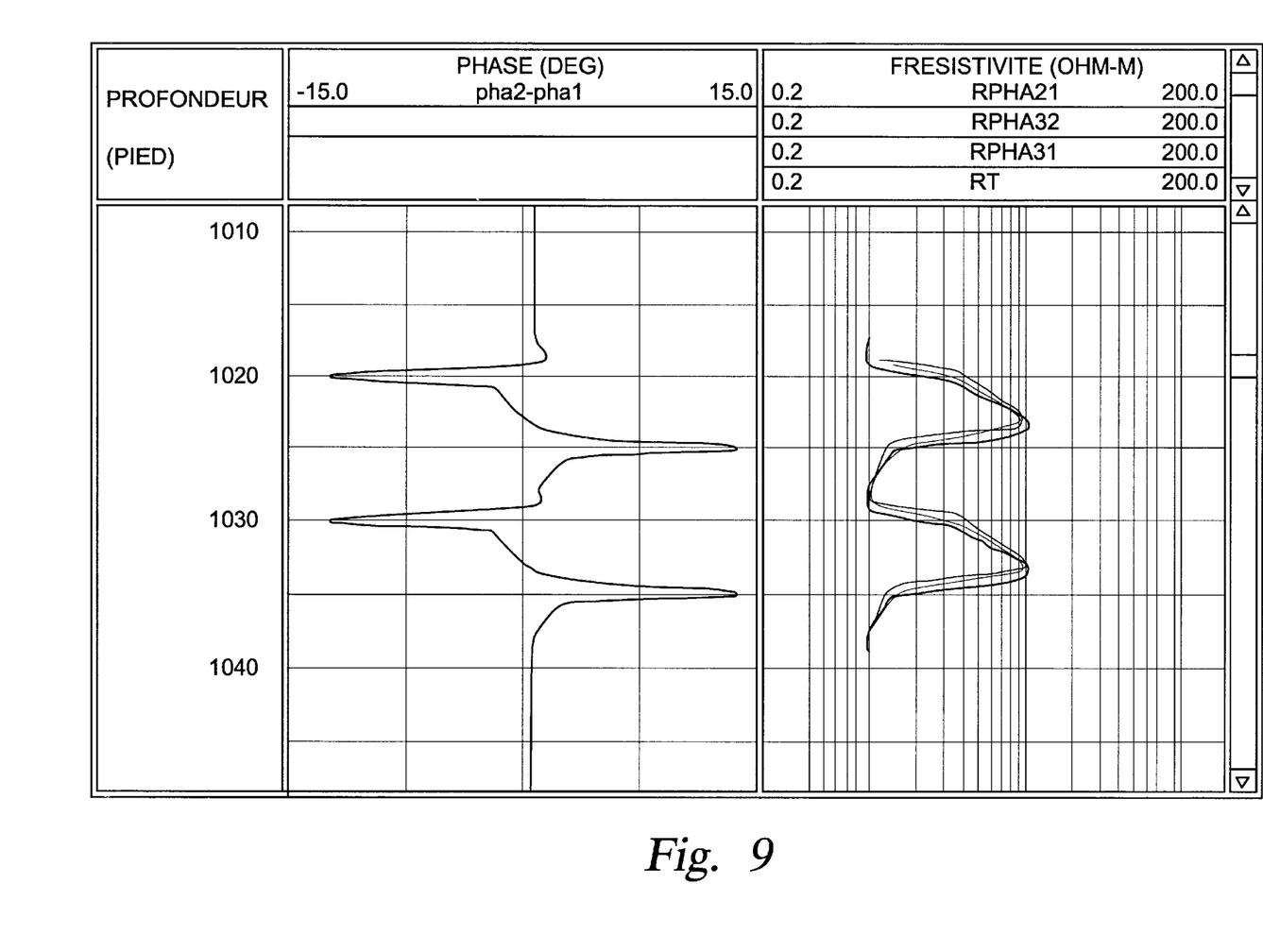
FIG. 9 is a first $\Delta\emptyset_4$ log as compared to the corresponding inflection point log.

FIG. 9 is a graph of $\Delta\emptyset_4$ for a vertical 10-foot section of the wellbore. Along the x-axis is a phase difference range from −15.0 degrees to 15.0 degrees. The y-axis ranges in depth from about 1010 feet to about 1045 feet. In FIG. 9, the graph of $\Delta\emptyset_4$ is placed next to the inflection point log from FIG. 3. As contrasted with a conventional inflection point log such as FIG. 3, the graph of $\Delta\emptyset_4$ contains sharp, well-defined curves corresponding to the depths of bed boundaries. Thus, the positive or negative peaks in $\Delta\emptyset_4$ at almost exactly 1020, 1025, 1030, and 1035 indicate bed boundaries precisely at those depths. Further, the large negative phase change at exactly 1020 feet indicates the entry by receiver $R_3$ of a high resistivity bed. The large positive phase change at exactly 1025 feet indicates that the resistivity tool is leaving the high resistivity layer and is entering a low resistivity layer. Thus, the tool not only measures with precision the depth of the bed boundary, but also whether the tool is entering or leaving a high resistivity region such as an oil-saturated sandstone layer.

Figure 10:
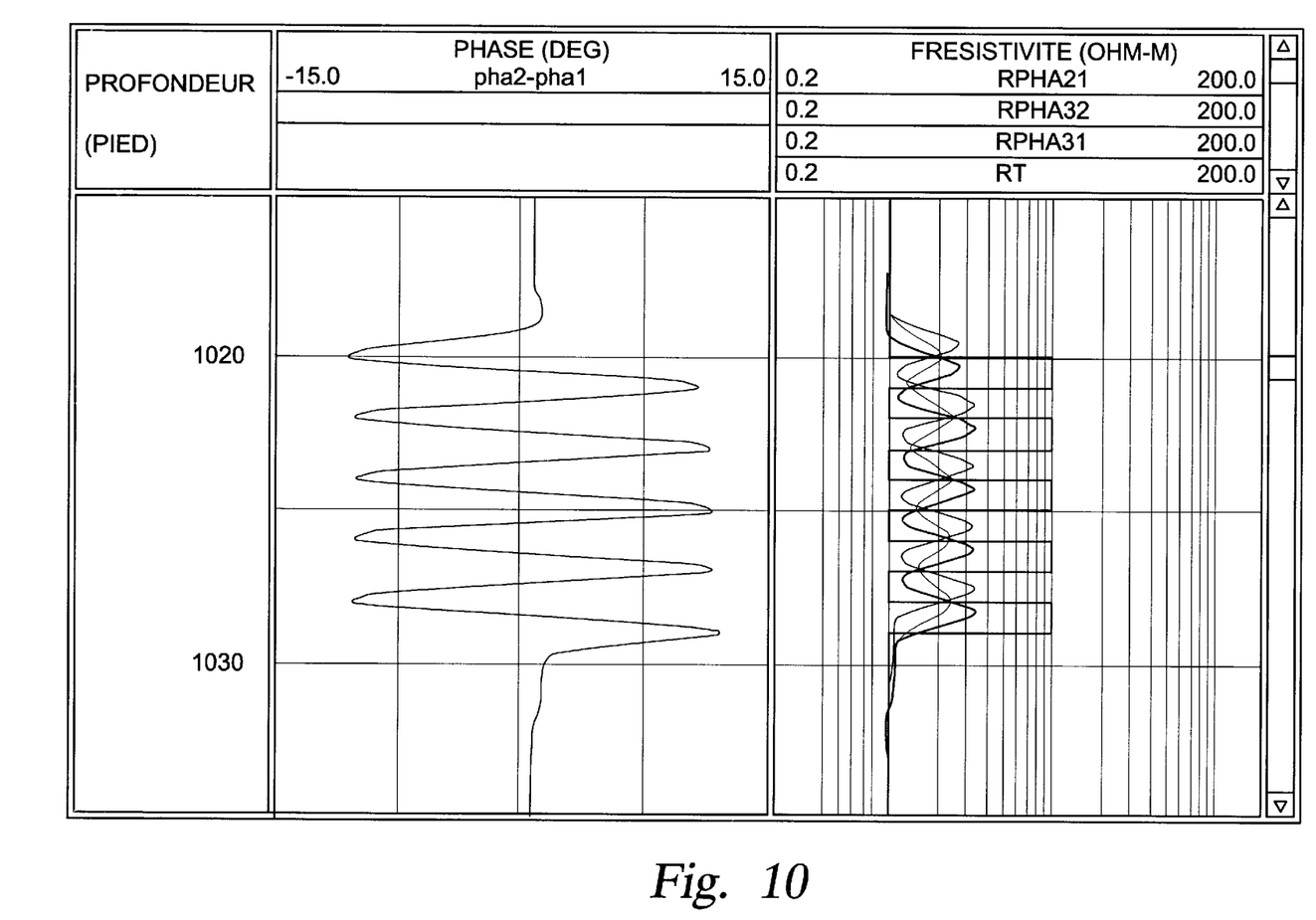
FIG. 10 is a second $\Delta\emptyset_4$ log as compared to the corresponding inflection point log.

FIG. 10 is a log of $\Delta\emptyset_4$ measurements of the same thin-layer bed formation recorded in FIG. 4. Along the x-axis is a phase difference range from −15.0 degrees to 15.0 degrees. The y-axis ranges in depth from about 1005 feet to about 1035 feet. For comparison purposes, the corresponding inflection point log from FIG. 4 is located adjacent the log of $\Delta\emptyset_4$. With the conventional inflection point of FIG. 4, it is extremely difficult to determine with any accuracy the exact depth of a bed boundary. As can be seen from FIG. 9, unlike a conventional inflection point log, the $\Delta\emptyset_4$ log clearly indicates the presence of a bed boundary at almost exactly 1020 feet, 1021 feet, etc. Further, based upon whether the $\Delta\emptyset_4$ peaks are positive or negative, it is apparent whether the tool is entering a higher or lower resistivity bed.

Figure 11:
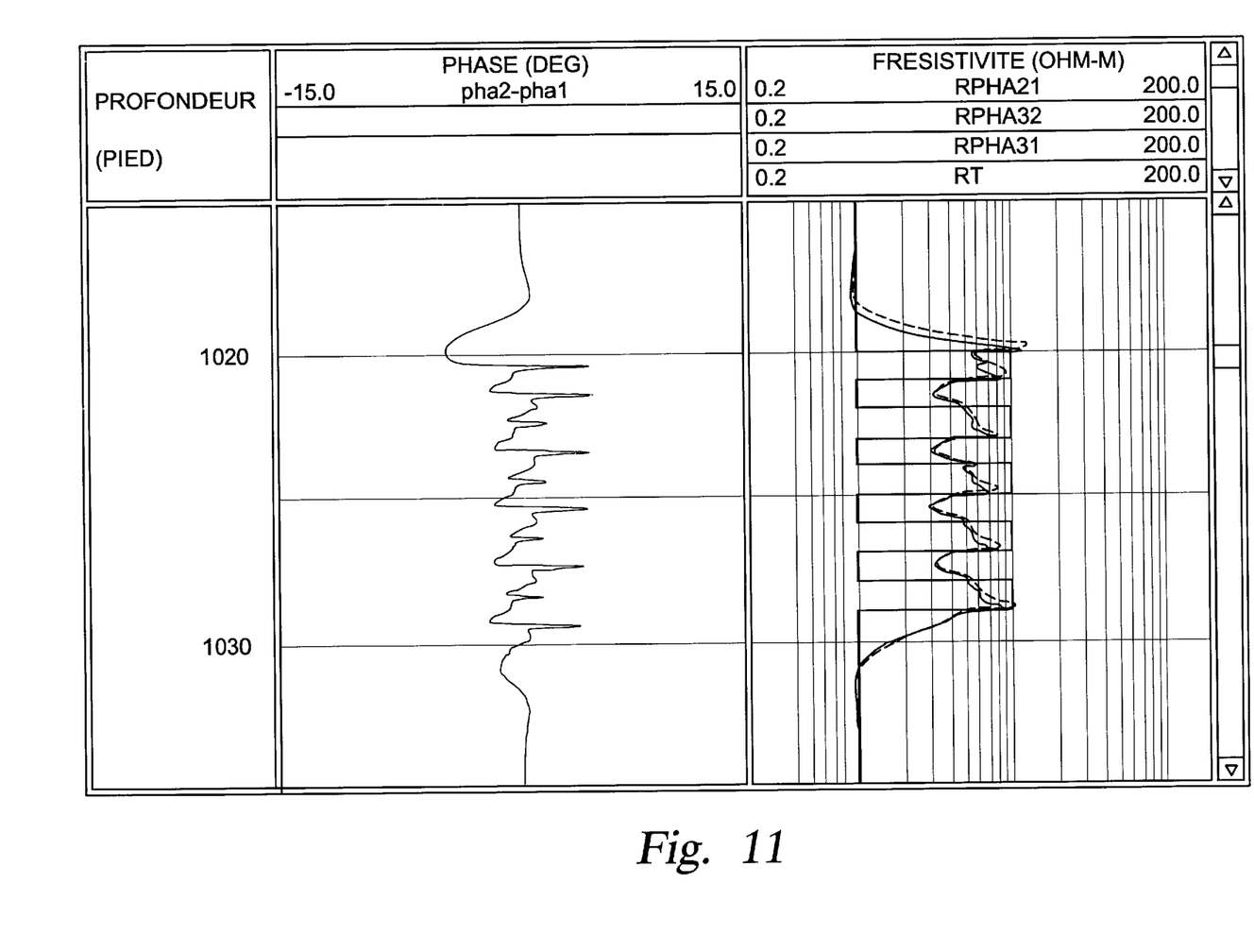

The tool also has applicability to deviated or directional wells through anisotropic formations. FIG. 11 includes a graph of $\Delta\emptyset_4$ values for a wellbore deviated 80° from vertical (i.e., almost horizontal) through an anisotropic formation. Anisotropic formations are formations whose resistivity may change not only vertically, but also horizontally through a bed layer. As can be seen, even in an anisotropic formation, this embodiment indicates the depth of a change in bed boundaries. It is believed that even better measurements would occur for a highly deviated well in an isotropic formation.

In the event that a tool having three or more receivers (such as that shown in FIG. 8) is not available, a two receiver resistivity tool may be used instead to implement a method of the invention. For example, a $\Delta\emptyset_1$ may be measured initially. The tool may then be moved forward a distance equal to the receiver spacing (i.e., the distance between receivers $R_1$ and $R_2$). The one or more transmitters may then be re-fired and a second phase difference, $\Delta\emptyset_2$, is measured. A processor or the like could operate on $\Delta\emptyset_1$ and $\Delta\emptyset_2$ to derive $\Delta\emptyset3$ and $\Delta\emptyset_4$ as explained above with reference to the preferred embodiment.

Figure 12:
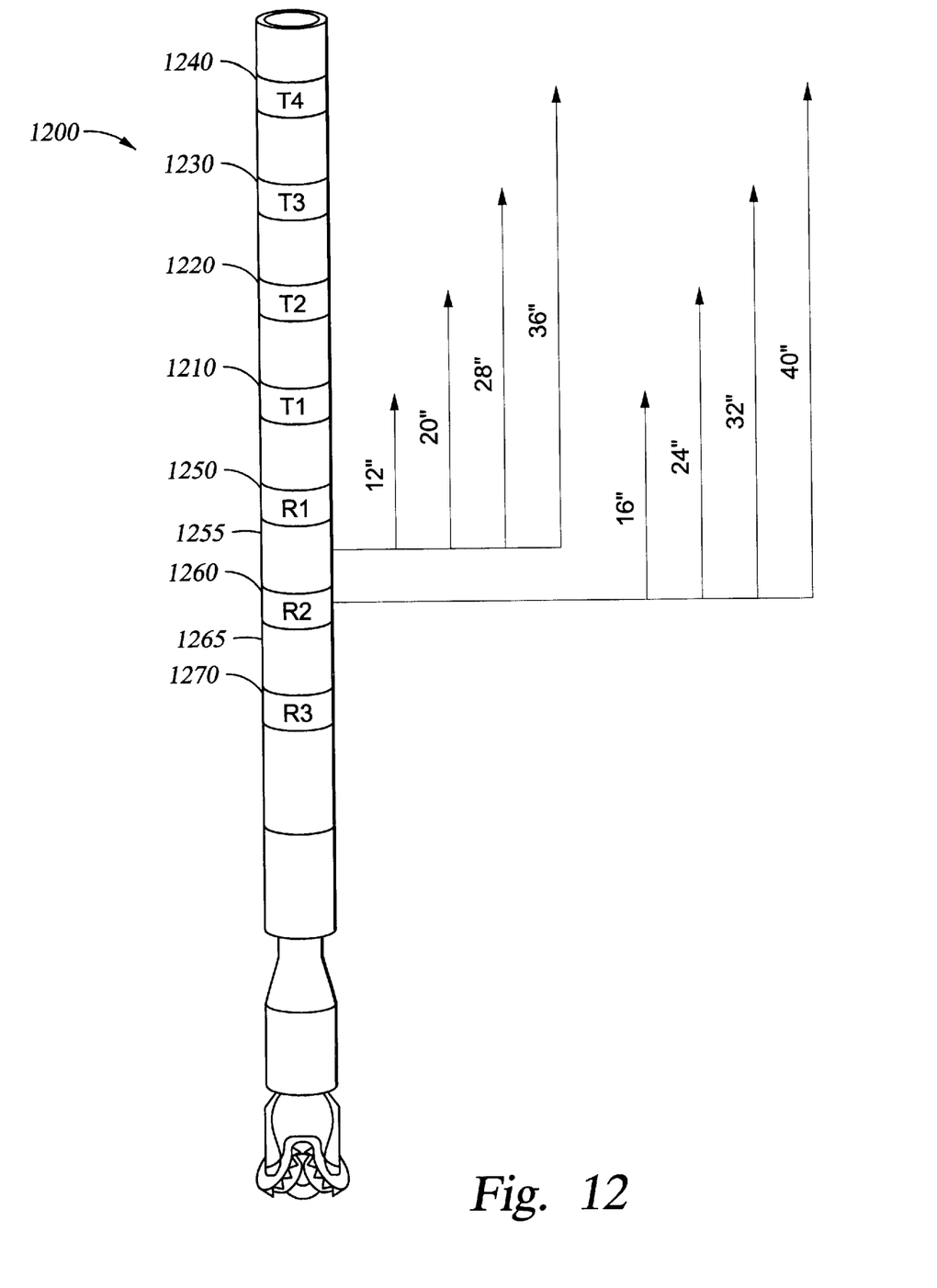
FIG. 12 is a second resistivity tool according to the invention.

One aspect of the invention also provides a higher radial resolution. FIG. 12 shows a resistivity tool 1200 including a first transmitter $T_1$ at axial location 1210, a second transmitter $T_2$ at axial location 1220, a third transmitter $T_3$ at axial location 1230, and a fourth transmitter $T_4$ at axial location 1240. Also part of the resistivity tool 1200 are first receiver $R_1$ at axial location 1250, second receiver $R_2$ at axial location 1260, and third receiver $R_3$ at axial location 1270. Measurement point 1255 is midway between receivers $R_1$ and $R_2$, while measurement point 1265 is midway between receivers $R_2$ and $R_3$. A measurement point corresponding to $\Delta\emptyset3$ also exists at location 1260. Associated electronics connected to the tool fire the transmitters at one or more preselected frequencies. The electronics also measure amplitude and phase angle at the receivers, or it may measure the attenuation and phase shift at the receivers.

A distance of 8" separates each of the transmitters $T_1$–$T_4$. Receivers $R_1$, $R_2$, and $R_3$ are each separated by 8" as well. A distance of 8" also exists between transmitter $T_1$ and receiver $R_1$. One particular advantage of the embodiment shown is the regular and incremental increase of measurement spacing distances. As can be seen, a first measurement distance between transmitter $T_1$ and measurement point 1255 exists and is 12". A second measurement distance, between transmitter $T_2$ and point 1255 is 20". A third measurement distance, between transmitter $T_3$ and point 1255 is 28". A fourth measurement distance between transmitter $T_4$ and point 1255 is 36". A fifth measurement distance between transmitter $T_1$, and point 1260 is 16". A sixth measurement distance between transmitter $T_2$ and point 1260 is 24". A seventh measurement distance between transmitter $T_3$ and point 1260 is 32". An eighth measurement distance between transmitter $T_4$ and point 1260 is 40".

Figure 13:
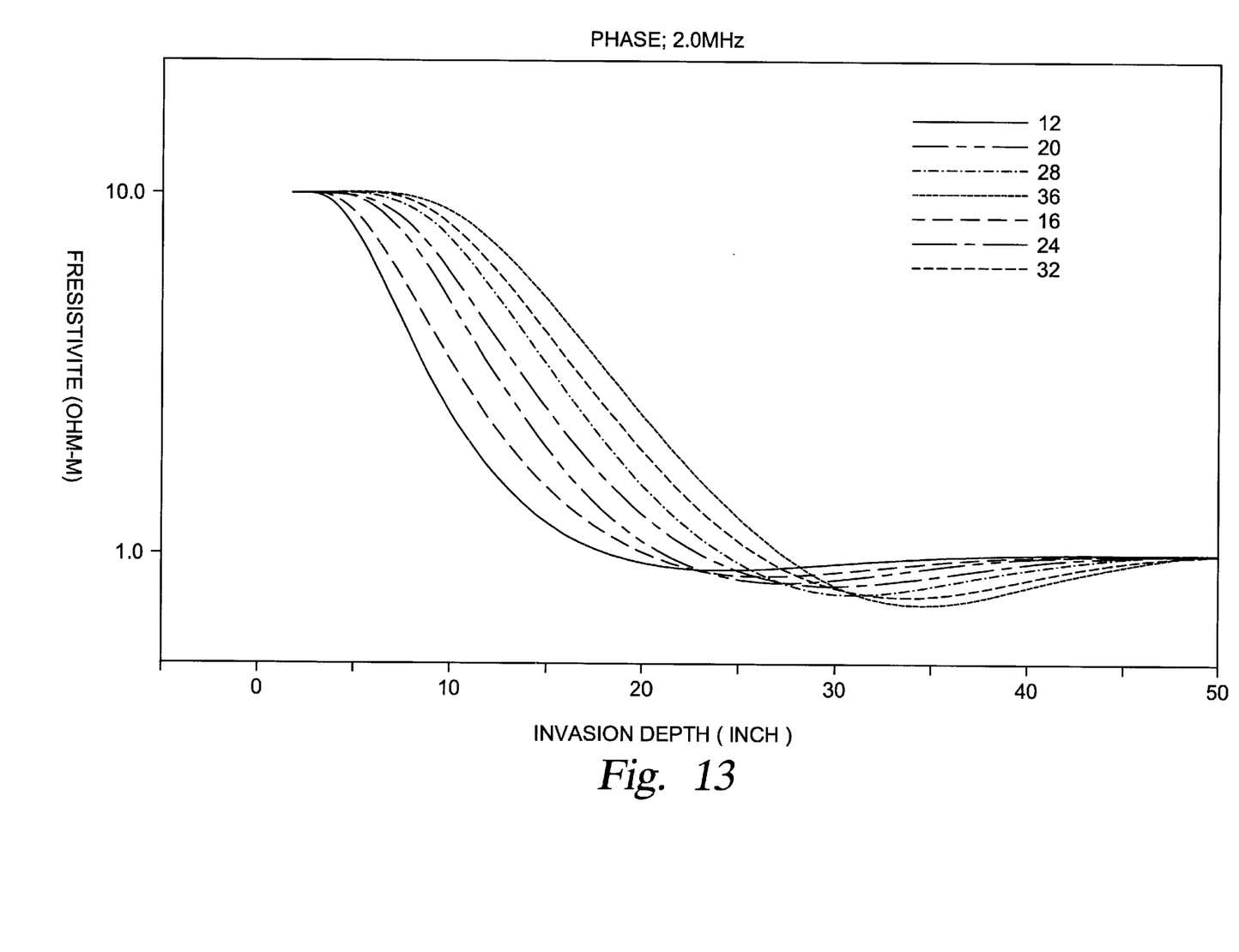
FIG. 13 is a resistivity-invasion depth graph according to the tool of FIG. 12.

Although these exact distances are not crucial to the invention, and it is within the skill of the ordinary artisan to change these spacings, it can be appreciated that the addition of receiver $R_3$ provides for additional measurement points, and the illustrated spacings provide multiple benefits. For example, there now exists transmitter-measurement point spacings of 12, 20, 28 and 36 inches with respect to the first measurement point, and 20, 28, 36, and 44 inches with respect to the second measurement point, resulting in duplicate measurement point spacings at 20, 28, and 36 inches. There also exists transmitter-measurement point spacings of 16, 24, 32 and 40 inches with respect to the third measurement point, yielding nine measurement spacings total. FIG. 13 is a resistivity-invasion depth graph including the radial response for 12, 20, 28, and 36 inch spacings as well as the 16, 24, and 32 inch measurement spacings. Consequently, FIG. 13 includes an increased number of data curves as compared to FIG. 7 and the radial resolution of the tool of FIG. 12 is improved with respect to a tool such as shown in FIG. 6.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A measurement-while-drilling tool, comprising:
  a transmitter capable of generating an electromagnetic signal;
  a first receiver positioned at a first location spaced apart from said first transmitter, said first receiver being capable of receiving said electromagnetic signal;

a second receiver positioned at a second location spaced apart from said first transmitter, said second receiver being suitable to receive said electromagnetic signal;

a third receiver positioned at a third location spaced apart from said first transmitter, said third receiver being suitable to receive said electromagnetic signal;

a first measurement location between said first and said second receivers, said first measurement location corresponding to a first phase shift of said electromagnetic signal;

a second measurement location between said second and said third receivers, said second measurement location corresponding to a second phase shift of said electromagnetic signal;

a processor associated with said first, second and third receivers, said processor operating on said first and second phase shifts to locate a change in resistivity proximate said second measurement location.

2. The measurement-while-drilling tool of claim 1, wherein said electromagnetic signal is a first frequency and wherein said transmitter is capable of generating an electromagnetic signal of a second frequency.

3. The measurement-while-drilling tool of claim 1, further comprising:

a second transmitter capable of generating a second signal, said second signal being detected at said first, second, and third receivers.

4. The measurement-while-drilling tool of claim 3, wherein said first signal from said first transmitter provides a first set of radial resistivity data and said second signal from said second transmitter provides a second set of radial resistivity data, said first set and said second set in combination providing a more detailed radial resistivity image than either of said first set and said second set alone.

5. The measurement-while-drilling tool of claim 1, wherein said measurement-while-drilling tool is a portion of a bottom hole assembly.

6. The measurement-while-drilling tool of claim 1, wherein said processor computes a difference of said first and second phase shifts.

7. The measurement-while-drilling tool of claim 6, wherein said difference of said first and second phase shifts is used to determine whether said measurement-while-drilling tool is entering a relatively high resistivity region or a relatively low resistivity region.

8. The MWD tool of claim 7, wherein said first and second phase shifts are used to determine whether said measurement-while-drilling tool is proximate a bed boundary.

9. The MWD tool of claim 1, wherein said first phase shift and second phase shift are used as part of a steerable bit system.

10. The measurement-while-drilling tool of claim 1, wherein said processor drives a third phase shift by averaging said first phase shift and said second phase shift.

11. The measurement-while-drilling tool of claim 1, wherein said processor calculates a bed resistivity.

12. A method to determine bed boundaries in a multi-layer formation, comprising:

a) measuring at a first location a first phase shift of a first travelling signal;

b) measuring at a second location different than said first location a second phase shift of a second travelling signal;

c) operating on said first phase shift and said second phase shift to determine if said first location corresponds to a different resistivity bed than said second location.

13. The method of claim 12, wherein said operating on said first and second phase shifts includes computing a difference value for said first and second phase shifts.

14. The method of claim 13, wherein an abrupt change of said difference indicates a bed boundary proximate said second location.

15. The method of claim 14, wherein said difference abruptly changes in a positive or negative direction, said abrupt change in said difference in one direction indicating that second location is proximate a high resistivity formation bed and said abrupt change in said difference in the opposite direction indicating that second location is proximate a low resistivity formation bed.

16. The method of claim 14, wherein said operating step indicates whether said first location is proximate a relatively higher resistivity than said second location.

17. The method of claim 12, wherein said method includes computing a third phase shift based upon said first and second phase shift.

18. The method of claim 12, wherein said first location corresponds to a first formation bed, and wherein a resistivity value is determined for said first formation bed.

19. The method of claim 12, further comprising:

d) transmitting from a downhole location to an uphole location the detected presence of a bed boundary.

20. The method of claim 12, wherein said first travelling signal is the same as said second travelling signal.

21. The measurement-while-drilling tool of claim 1, wherein said receivers are spaced at different predetermined distances from said transmitter.

22. The measurement-while-drilling tool of claim 1, wherein said measurement locations are located at different locations from each other.

23. The measurement-while-drilling tool of claim 1, further comprising:

a second transmitter capable of generating a second signal, the entirety of said signal being detected at said first, second, and third receivers.

24. The measurement-while-drilling tool of claim 1, wherein said transmitter, said first receiver, said second receiver and said third receiver are all parallel.

* * * * *